Jan. 13, 1931.  E. GRUBER  1,788,948
TRAP FOR REFRIGERATING APPARATUS
Filed June 30, 1928
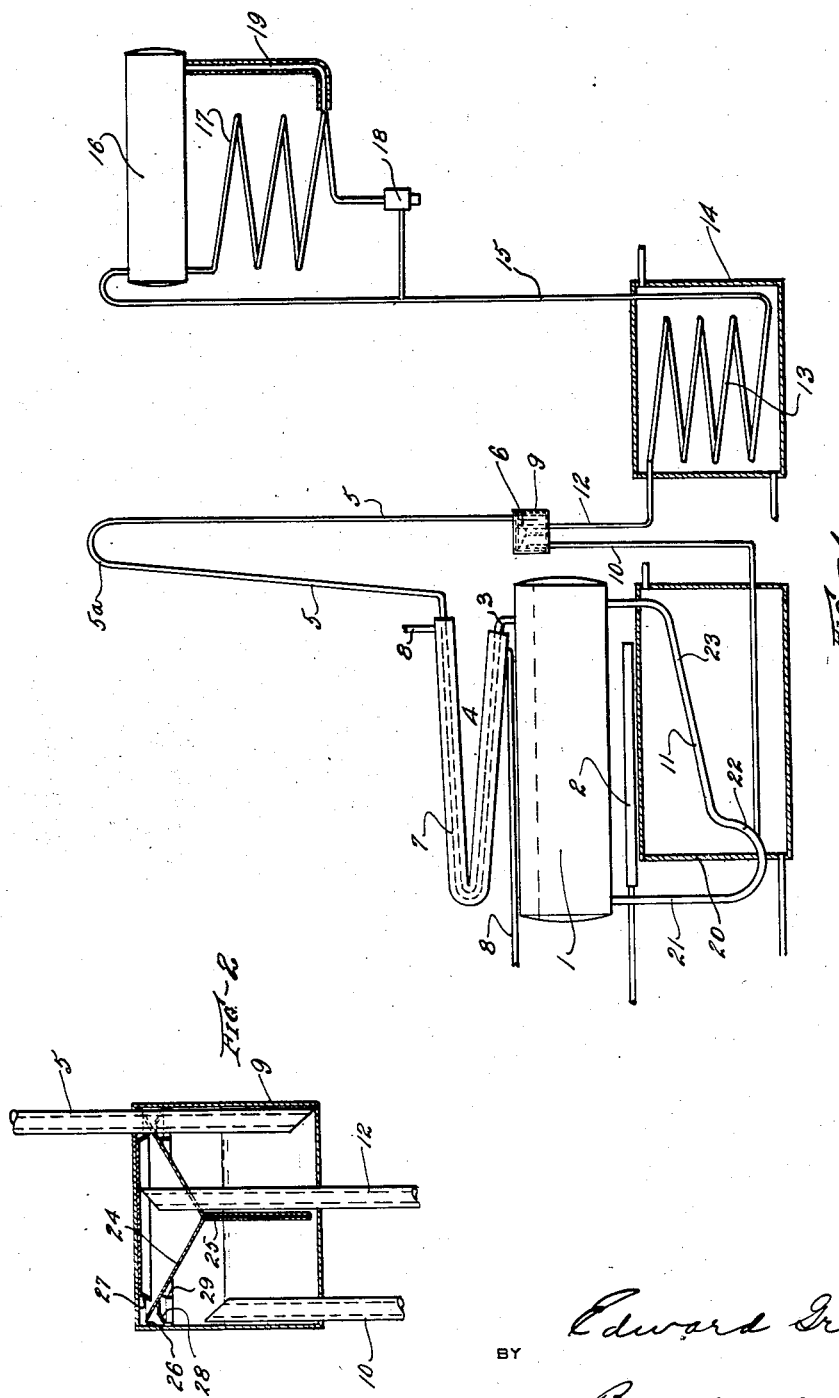
INVENTOR
Edward Gruber
BY
Brockett & Hyde
ATTORNEYS Patented Jan. 13, 1931

1,788,948

UNITED STATES PATENT OFFICE

EDWARD GRUBER, OF CLEVELAND, OHIO, ASSIGNOR TO EDMUND E. ALLYNE, OF CLEVELAND, OHIO

TRAP FOR REFRIGERATING APPARATUS

Application filed June 30, 1928. Serial No. 289,551.

This invention relates to absorption type refrigerating systems, in which a suitable refrigerant such as ammonia is generated or driven off from a suitable absorbing agent such as water, is condensed or liquefied in a condenser, and collected in an evaporator during the heating cycle; which heating cycle is followed by a refrigerating cycle during which the refrigerant is gasified, returned to the boiler or still, and absorbed in the absorbing agent therein.

Included in the system on the boiler side of the condenser is a liquid seal trap through which connection between the condenser and the boiler is had, the trap having an inlet connection for gas driven off from the boiler liquor during the heating cycle, and a return connection to the boiler for gas and liquor during the refrigerating cycle. In such a system, upon cessation of the heat it is necessary to initiate return flow of the gas from the evaporator to the boiler and produce and continue absorption. The initial return impulse usually causes a gob or slug of liquor to be picked up from the condenser and thrown into the trap. This liquor being cool, its injection into the hot contents of the trap would ordinarily cause it to quickly be vaporized with violent retarding effect on the refrigerating cycle.

It is an object of my invention to provide means in the trap for withholding from the liquor in the trap, such slugs of liquor received from the condenser means. To this end I provide in the trap baffle means adapted to collect liquor thus received, and a restricted passage for leading said liquor into the trap liquor with a delayed or retarded and extended action so that liquor received at the trap from the condenser will be immediately separated from the gas but will only gradually find its way into the trap liquor.

The exact nature of the invention together with further objects and advantages thereof will be apparent from the following description taken in connection with the accompanying drawings in which Fig. 1 is a diagrammatic view of an absorption type of refrigerating system in which my invention is incorporated, and Fig. 2 is a detailed sectional view of the illustrative form of trap indicated in Fig. 1.

With reference now to the drawings the boiler or still is indicated at 1 and may be of any suitable form heated in any suitable manner such as by an electric current, steam coils, or by the gas burner 2 shown. The gas distilled from the boiler is conducted by a pipe 3 from its top through a rectifier 4 and thence by a pipe 5 having an upward loop 5a to a trap 6. The rectifier is in one sense a simple form of condenser including a jacket 7 surrounding a portion of the pipe 3 and provided with connections 8 through which a cooling agent such as water may be circulated.

The trap 6 includes an outer shell or casing 9 into the top of which the pipe 5 extends, its lower end being open at a lower level in the trap. The trap is also connected to a return pipe 10, the open end of which is above the bottom of the pipe 5, said return pipe communicating at its other end with a return bend or loop 11 connected to the boiler for circulating the absorbing agent for cooling purposes as will later appear.

From the top of the trap 6 a pipe 12 leads downwardly to a condenser 13 including the necessary coils or turns of pipe emerged in cooling water in a tank 14, and on the other side of the condenser a pipe 15 conducts the refrigerant, now liquefied, to the top of the evaporator which includes a tank or reservoir 16 and a number of cooling coils 17 communicating with the bottom thereof and connected to a trap 18 draining into the pipe 15.

The loop 11 has two legs, one of which, marked 21, is exposed to the atmosphere and is not subjected to any cooling effect, so that it is maintained at about the temperature of the boiler by the heat conducted thereto along the metal, but the other leg extends to and is immersed in cooling water in the tank 20. The leg 21 is substantially vertical, but the other leg of the loop has a rapidly rising or nearly vertical portion 22 beyond which the pipe is extended laterally on a more gradual incline 23, to increase the length of pipe in contact with the cooling water; and the pipe 10 communicates with the leg at the bottom of its rapidly rising portion 22.

The trap 18 is for the purpose of maintaining the charge of useful refrigerant in the evaporator 16, by permitting return of the weaker liquor through the pipe 15 to the boiler the return including any absorbing agent which may have found its way to the evaporator.

Pipe 19 is a circulating pipe for the useful refrigerant to be delivered from the tank 16 to a low point in the evaporator for evaporation therein.

The trap 6 has several purposes. It provides a return from this point in the system to the boiler through the pipe 10, permitting excess liquor to be returned to the boiler. The trap 6 also serves as a means for permitting free flow from the top of the boiler to the evaporator during the heating cycle, by compelling the gas returned from the evaporator to the boiler during the refrigerating period to be introduced to the boiler below the level of liquor therein. Normally the trap 6 is filled with liquor to about the level of the open end of the pipe 10, with the lower end of pipe 5 immersed in said liquor. During the boiling operation the gas discharged from the boiler bubbles out from the lower end of pipe 5 and finds a free passage through pipe 12 to the condenser, but during the refrigerating cycle the gas returning through pipe 12 can not return through pipe 5, except by depressing the liquor in the trap and forcing it over to the boiler through pipe 5, and the bend 5a of this pipe is made sufficiently high so that the leg of liquor thus raised forms a practical water seal, and the returning gas finds an easier path to the boiler through the pipe 10 and loop 11.

All three parts to be cooled, to wit, the rectifier, the tank 20, and the tank 14, are supplied with a cooling agent such as water, which may be circulated separately and continuously through all of these parts, or in series through them.

In operation the gas distilled from the boiler is first delivered to the rectifier, where it encounters the cooling effect of the jacket 7 causing condensation into liquid form of any of the absorbing agent which may be carried over entrained with the gas and such condensed liquor returns by gravity to the boiler. The gas now partially cooled, is delivered to the trap 6 and thence to the condenser 13 where it is additionally cooled and, as the pressure increases, is liquefied. The liquefied refrigerant in the condenser is delivered to the evaporator pipe 15, the trap 18 holding in the evaporator all useful refrigerant until at the end of the boiling period the evaporator is fully charged with useful refrigerant, although a slight quantity may also be present in the condenser. The heat is now shut off.

Condensation continues for a very brief interval, but the pressure in the condenser quickly drops to a point below which condensation can not occur. However, for a short period thereafter the cooling effect at both the condenser and rectifier continues to produce contraction of the gas, but because the rectifier is close to the boiler the temperature of the gas as it reaches the same is considerably higher than is the temperature of the gas when it reaches the condenser. Therefore, there is a much greater drop in temperature of the gas at the rectifier than at the condenser, and during the early portion of the cooling period the gas contraction at the rectifier is predominant.

The rectifier, therefore, is at first below the point of low pressure as it were, producing a suction effect through the pipe 5 upon the trap 6 but more important producing a like suction effect through the pipe 3 upon the boiler. In the direction of trap 6 said effect is merely to raise the supply of liquor in the pipe 5 but in the direction of the boiler the effect is to raise the level of liquor therein with a suction effect in the pipe 10 which completely drains said pipe of liquor until finally gas enters the loop 11 from the pipe 10. The liquor in said pipe which is delivered at first, the refrigerant in the condenser, and the gas which follows it, are all discharged into the rapidly rising portion 22 of the cooled leg of the loop, and the rising gas bubbles initiate circulation in the loop, downwardly through the leg 21 and upwardly through the leg 22, 23. The first liquor that flows from leg 21 past the entrance at pipe 10 is relatively hot weak liquor and the bubbles rise far enough to produce active circulation. Such circulation cools the absorbing agent circulated through the loop 11 and produces absorption therein of the gas flowing from pipe 10.

The net effect of the location of the rectifier between the boiler and trap 6 and of keeping the trap 6 cooled during the boiling operation is to initiate return flow of the gas from the evaporator to the boiler very promptly as the heat is shut off and thereby initiate absorption, which is continued throughout the refrigerating period and, as is usual in these systems, produces the necessary suction effect to continue the flow of gas. At the initiation of this return flow, however, as has already been described, a slug of liquor refrigerant is usually discharged from the condenser into the trap, and should this be the case the refrigerant being at a relatively low temperature as compared with the trap liquor, should the refrigerant be immediately turned into the trap liquor it would as immediately vaporize, setting up a back pressure which would retard the continuation of the refrigerating cycle. Therefore, according to my invention I provide, preferably in the trap as indicated, means for retarding delivery of this condensed refrigerant into the trap liquor, but permitting free flow of gas from the condenser to the boiler liquor.

Turning now to Fig. 2 of the drawings, which illustrates an embodiment of my invention, I mount within the cylindrical casing 9 of the trap 6 a funnel comprising an inverted cone 24 located in the air space in the trap and connected at its apex with an open-ended tube 25 terminating near the bottom of the casing and thus in the liquor containing portion of the trap, which tube forms the small end of the funnel. The opening in the tube 25 is small and I have found about $\frac{1}{16}''$ diameter satisfactory for the purpose. The upper extremity of the large end of the funnel is secured with but spaced from the top wall of the casing 9 in any convenient manner, leaving peripheral clearances 26. Adjacent the periphery of the cone and secured with the top wall of the casing is a downwardly extending baffle 27 clearing the cone to form an annular opening thereabout. Similarly beneath the edge of the cone and secured with the side wall of the casing is an upwardly extending baffle 28 clearing the cone. Small spaced drainage openings 29 are provided in the baffle 28 adjacent the casing walls.

By the arrangement described gas entering the trap by way of the pipe 12, as during the refrigerating cycle, has a substantially free path to the mouth of the pipe 10 by way of the clearance between the cone and the baffle 27, the clearance 26 between the cone and the casing 9, and the clearance between the cone and the baffle 28. When, however, a slug of liquor becomes entrained with the gases entering through the pipe 12, this liquor impinges from the top wall of the casing 9 and drops downwardly into the cone. Owing to the small opening in the pipe 25 the liquor will momentarily rise in the cone as indicated, Fig. 2, and only gradually flow downwards through the pipe and into the trap liquor; eventually, of course, causing overflow of the trap liquor into the pipe 10.

What I claim is:

1. Absorption refrigerating apparatus of the intermittent cyclic type comprising a boiler, a condenser, an evaporator, a liquid trap at substantially the liquid level in the boiler, a boiler pipe connection leading from the top of the boiler to a point below the surface of the liquid in the trap, a condenser pipe leading from a point above the surface of the liquid in the trap to the condenser, an evaporator pipe leading from the condenser to the evaporator, a gas return pipe leading from a point above the liquid in the trap to the bottom of the boiler, and means in said trap above the liquid level therein for receiving and baffling the gas as it enters the trap from the condenser through the condenser pipe.

2. Absorption refrigerating apparatus as set forth in claim 1 wherein the means for receiving and baffling the returning gas in the condenser is provided with baffled openings leading to the liquid in the trap and the pipes leading to the boiler, and an additional restricted means for leading any liquid collected by said means to a point below the surface in the liquid in the trap for delivering any liquid gas coming over from the condenser in small quantities below the surface of the liquid in the trap.

3. Absorption refrigerating apparatus as in claim 1 wherein the means for receiving and baffling the returning gas in the condenser comprises a partition located in the trap above the liquid therein, extending below the opening of the condenser pipe and above the openings of the boiler and gas return pipes, and provided with baffled openings for baffling the flow of gas returning from the condenser and preventing it from having a direct action upon the liquid in the trap and breaking the seal in the boiler pipe.

4. Absorption refrigerating apparatus as in claim 1 wherein means for receiving and baffling the gas from the condenser comprises a funnel-shaped partition arranged in the trap above the liquid therein, separating the discharge of the condenser pipe from the open ends of the boiler and gas return pipes and provided with openings near its periphery leading from the top to the bottom of the trap, and means for baffling the discharge through said openings.

5. Absorption refrigerating apparatus as in claim 1 wherein means for receiving and baffling the gas from the condenser, comprises a funnel-shaped partition arranged in the trap above the liquid therein, separating the discharge of the condenser pipe from the open ends of the boiler and gas return pipes and provided with openings near its periphery leading from the top to the bottom of the trap, means for baffling the discharge through said openings, and including baffles arranged above and below the periphery of said funnel-shaped partition.

6. Absorption refrigerating apparatus as in claim 1 wherein means for receiving and baffling the gas from the condenser, comprises a funnel-shaped partition arranged in the trap above the liquid therein, separating the discharge of the condenser pipe from the open ends of the boiler and gas return pipes and provided with openings near its periphery leading from the top to the bottom of the trap, means for baffling the discharge through said openings, and a restricted discharge device at the apex of said funnel for delivering any liquid gas therein to the liquid in the trap.

7. Absorption refrigerating apparatus as in claim 1 wherein means for receiving and baffling the gas from the condenser comprises a funnel-shaped partition arranged in the trap above the liquid therein, separating the discharge of the condenser pipe from the open ends of the boiler and gas return pipes and provided with openings near its periphery leading from the top to the bottom of the trap, means for baffling the discharge through said openings, and a restricted discharge device at the apex of said funnel for delivering any liquid gas to the liquid in the trap comprising a tube extending from the apex of said funnel to a point near the bottom of the trap.

8. Absorption refrigerating apparatus of the intermittent cyclic type comprising a boiler, a rectifier, a condenser, an evaporator, a liquid trap at substantially the level of the liquid in the boiler, a boiler pipe connection leading from the top of the boiler to a low point of the rectifier, a rectifier type leading from the top of the rectifier to the trap to a point below the surface of the liquid in the trap, a condenser pipe leading from a point above the surface of the liquid in the trap to the condenser, an evaporator pipe leading from the condenser to the evaporator, a gas return pipe leading from a point above the liquid in the trap to the bottom of the boiler, and means in said trap above the liquid level therein for receiving and baffling the gas after it enters the trap from the condenser through the condenser pipe.

In testimony whereof I hereby affix my signature.

EDWARD GRUBER.